Aug. 18, 1964    J. H. A. MARKHAM ETAL    3,144,865
GAG FOR ANIMALS
Filed March 8, 1963

3,144,865
GAG FOR ANIMALS
John Herbert Acheson Markham, 36 Carisbrooke Road, Newport, Isle of Wight, England, and William Lyle Stewart, Benwell, Upper Oddington, Moreton-in-Marsh, England
Filed Mar. 8, 1963, Ser. No. 263,917
Claims priority, application Great Britain Mar. 13, 1962
12 Claims. (Cl. 128—19)

The present invention relates to a gag for animals having incisor teeth at the front of their lower jaw (ruminating animals) which normally occlude against a dental pad at the front of their upper jaw.

Because animals of this category do not have teeth against which the lower incisor teeth occlude natural grinding down of the incisors is limited to the grinding down effect caused by the friction of the incisors against the dental pad. The grinding down effect in this case is much less than in the case of animals who have both upper and lower incisor teeth and the incisor teeth of animals having a dental pad increase in length until finally they are too long to occlude properly with the dental pad and pass in front of this pad. When they reach this stage the animals are unable to graze properly and their teeth loosen and fall out (this condition is known as "broken mouth"). It is therefore advantageous to examine the incisor teeth periodically and to apply conservation treatment, for example griding down of the teeth, where necessary.

A gag, for an animal having incisor teeth at the front of its lower jaw which normally occlude against a dental pad at the front of its upper jaw, comprising a first part shaped and dimensioned for insertion in the animal's mouth and for supporting the upper jaw of the animal, portions of the upper surface of the first part defining a depression therein capable of receiving the dental pad of the animal, a second part of curved form disposed below said first part and constructed and dimensioned for receiving the front of the lower jaw of the animal, a third part interconnecting the first and second parts, portions of the third part and of the second part defining an aperture shaped and dimensioned for receiving the incisor teeth of the animal, the portions of the second part defining the lower limit of the aperture and preventing the lower lip of the animal from passing up to the occlusal surfaces of the incisor teeth, and a fourth part extending downwardly from and connected to at least one of said first and third parts above the said portions of the third part and shaped and dimensioned for preventing the tongue of the animal from touching its incisor teeth.

For a better understanding of the present invention and to show how the same may be carried into effect, reference will now be made, by way of example, to the accompanying drawings, in which.

Figure 2:
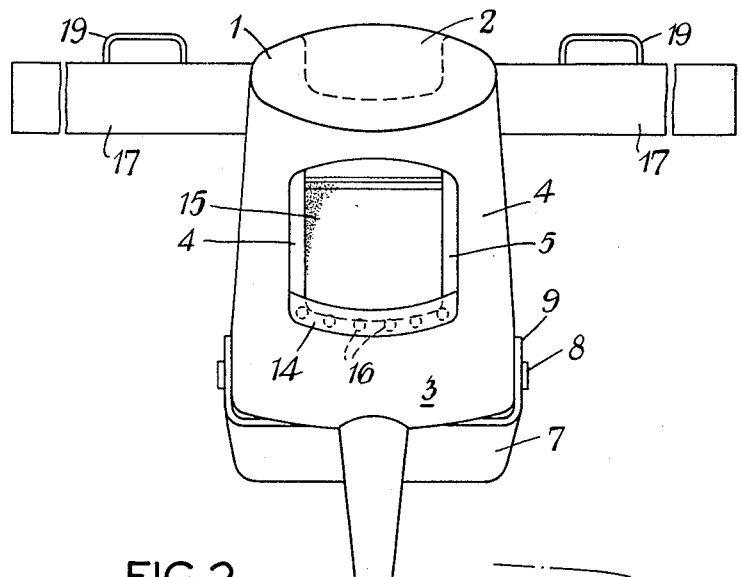
FIGURE 2 is a front view of the gag shown in FIGURE 1.
Figure 1:
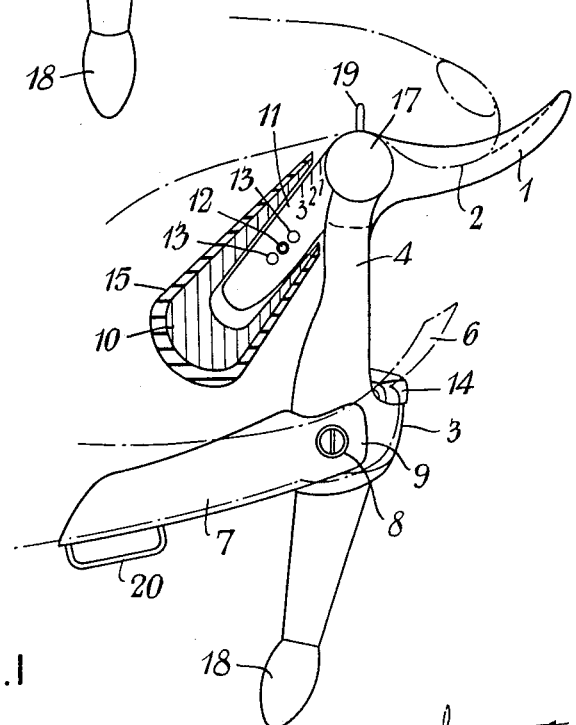
FIGURE 1 is a partly sectioned side view of a gag.

Referring now to the drawings, part of a sheep's head is shown in dotted lines in FIGURE 1 with a gag positioned in the mouth of the sheep. A first part 1 of the gag lies just underneath the dental pad of the animal and projects forwardly beyond the upper lip of the animal, the dental pad of the animal lying in a depression 2 (shown in dotted lines) in the part 1. A second part 3 of the gag (FIGURES 1 and 2) extends below and in front of the lower lip of the animal and also a short distance into the mouth above the lower lip. A third part 4 interconnects the first and second parts and is formed with an aperture 5 through which the incisor teeth 6 of the animal pass. Portions of the second part define the lower limit of the aperture and prevent the lower lip of the animal from passing up the outside of the incisor teeth up to or above the occlusal surfaces of the incisor teeth. The lower jaw of the animal rests partially in the part 3 and partially in a fifth part 7. The part 7 is adjustable angularly with relation to the part 3 by means of screws 8 which clamp flanges 9 of the part 7 against the part 3. Gripping washers are provided between the parts to prevent slipping of the portion 7 after the screws 8 have been tightened.

A fourth part or mandible block 10 covered with soft rubber 15 or similar material is shown in cross-section in FIGURE 1. This mandible block is slidably mounted on a projection 11 of the gag and may be held in one of three positions by a screw 12 passing through holes in the side of the block (not shown) and through one of three holes 13 in the projection 11. Markings on the side of the projection indicate the position of the block. This mandible block rests behind the incisor teeth in the inter-dental space of the animal and prevents the tongue of the animal touching the incisor teeth. The block 10 may be made of a rigid material covered with soft rubber 15, or other resilient material, or it may be made of hard rubber covered with soft rubber.

The upper edge of the portion 3 is provided with a soft rubber, or similar resilient material, covering 14. This soft rubber covering is bound on to the portion 3 employing small holes 16 in the part 3 (shown in dotted lines in FIGURE 2). Screws or clips can, instead, be used to attach the soft rubber covering. The soft rubber 14 extends downwardly to cover a substantial section of the surface of the part 3 facing into the mouth. This soft rubber covering 14 forms a comfortable underlay for the incisor teeth and that part of the mandible immediately below these teeth. Two lateral handles 17 and a median handle 18 are provided for manipulating the gag and also the animal's head when the gag is in the mouth. Two rings 19 are positioned on the handles 17 to which straps, for fastening the gag on to the animal, can be fixed. A slide or keeper 20 is provided on the part 7 through which a strap may be passed to hold the gag firmly in the animal's mouth. The slide 20 is positioned at the rearmost end of the part 7 so that a holding strap for the gag would pass over the hard portion of the nose of the animal and not at the front part of the nose which is pliable and could be easily blocked.

The parts 7, 3, 1 and 4 of the gag may be made of stainless steel and the items 10 and 14 are so made and mounted as to be easily replaceable.

We claim:

1. A gag, for an animal having incisor teeth at the front of its lower jaw which normally occlude against a dental pad at the front of its upper jaw, comprising a first part shaped and dimensioned for insertion in the animal's mouth and for supporting the upper jaw of the animal, portions of the upper surface of the first part defining a depression therein capable of receiving the dental pad of the animal, a second part of curved form disposed below said first part and constructed and dimensioned for receiving the front of the lower jaw of the animal, a third part interconnecting the first and second parts, portions of the third part and of the second part defining an aperture shaped and dimensioned for receiving the incisor teeth of the animal, the portions of the second part defining the lower limit of the aperture and preventing the lower lip of the animal from passing up to the occlusal surfaces of the incisor teeth and a fourth part extending downwardly from and connected to at least one of said first and third parts above the said portions of the third part and shaped and dimensioned for preventing the tongue of the animal from touching its incisor teeth.

2. A gag according to claim 1 further comprising a fifth part connected to said second part and extending rearwardly therefrom, portions of the upper surface of the fifth part defining a depression therein shaped and dimensioned for receiving a part of the animal's lower jaw immediately behind the part which is received by said second part.

3. A gag according to claim 2 further comprising a coupling between said fifth part and said second part constructed to allow angular adjustment of the fifth part with respect to the second part.

4. A gag, for an animal having incisor teeth at the front of its lower jaw which normally occlude against a dental pad at the front of its upper jaw, comprising a first part shaped and dimensioned for insertion in the animal's mouth and for supporting the upper jaw of the animal, portions of the upper surface of the first part defining a depression therein capable of receiving the dental pad of the animal, a second part of curved form disposed below said first part and constructed and dimensioned for receiving the front of the lower jaw of the animal, a third part interconnecting the first and second parts, portions of the third part and of the second part defining an aperture shaped and dimensioned for receiving the incisor teeth of the animal, the portions of the second part defining the lower limit of the aperture and preventing the lower lip of the animal from passing up to the occlusal surfaces of the incisor teeth and a fourth part comprising a projection extending downwardly from and connected to at least one of said first and third parts above the said portions of the third part, a further part, slidably mounted on the projection and shaped and dimensioned for preventing the tongue of the animal from touching its incisor teeth and means for locking the further part in any one of a number of positions on said projection.

5. A gag according to claim 4 further comprising a fifth part connected to said second part and extending rearwardly therefrom, portions of the upper surface of the fifth part defining a depression therein shaped and dimensioned for receiving a part of the animal's lower jaw immediately behind the part which is received by said second part.

6. A gag according to claim 5 further comprising a coupling between said fifth part and said second part constructed to allow angular adjustment of the fifth part with respect to the second part.

7. A gag, for an animal having incisor teeth at the front of its lower jaw which normally occlude against a dental pad at the front of its upper jaw, comprising a first part shaped and dimensioned for insertion in the animal's mouth and for supporting the upper jaw of the animal, portions of the upper surface of the first part defining a depression therein capable of receiving the dental pad of the animal, a second part of curved form disposed below said first part and constructed and dimensioned for receiving the front of the lower jaw of the animal, a third part interconnecting the first and second parts, portions of the third part and of the second part defining an aperture shaped and dimensioned for receiving the incisor teeth of the animal, the portions of the second part defining the lower limit of the aperture and preventing the lower lip of the animal from passing up to the occlusal surfaces of the incisor teeth, and a fourth part covered with soft resilient material extending downwardly from and connected to at least one of said first and third parts above the said portions of the third part and shaped and dimensioned for preventing the tongue of the animal from touching its incisor teeth.

8. A gag according to claim 7 wherein the soft resilient material is soft rubber.

9. A gag, for an animal having incisor teeth at the front of its lower jaw which normally occlude against a dental pad at the front of its upper jaw, comprising a first part shaped and dimensioned for insertion in the animal's mouth and for supporting the upper jaw of the animal, portions of the upper surface of the first part defining a depression therein capable of receiving the dental pad of the animal, a second part of curved form disposed below said first part and constructed and dimensioned for receiving the front of the lower jaw of the animal, a third part interconnecting the first and second parts, portions of the third part and of the second part defining an aperture shaped and dimensioned for receiving the incisor teeth of the animal, the portions of the second part defining the lower limit of the aperture, a coating of soft resilient material covering said portions of the second part and together with these portions preventing the lower lip of the animal from passing up to the occlusal surfaces of the incisor teeth and a fourth part extending downwardly from and connected to at least one of said first and third parts above the said portions of the third part and shaped and dimensioned for preventing the tongue of the animal from touching its incisor teeth.

10. A gag according to claim 9 further comprising a fifth part connected to said second part and extending rearwardly therefrom, portions of the upper surface of the fifth part defining a depression therein shaped and dimensioned for receiving a part of the animal's lower jaw immediately behind the part which is received by said second part.

11. A gag according to claim 10 further comprising three handles for manipulation of the gag, one handle being connected to the second part and extending downwardly therefrom and the two other handles extending sidewardly, one at one side of the gag and the other at the other side of the gag, and connected to at least one of said first and third parts above the said portions of the third part.

12. A gag according to claim 10 further comprising a metal ring, located on the underneath surface of the fifth part, for receiving a strap for use in the fixing of the gag firmly on the animal.

References Cited in the file of this patent
UNITED STATES PATENTS 2,257,696    Lent _____ Sept. 30, 1941
2,969,059    Meck et al. _____ Jan. 24, 1961